United States Patent
Haffner et al.

[11] 3,786,253
[45] Jan. 15, 1974

[54] GAMMA AND NEUTRON SCINTILLATOR

[75] Inventors: James W. Haffner, Hacienda Heights; Llewellyn S. Pearce, Bradbury, both of Calif.

[73] Assignee: North American Rockwell Corporation, El Segundo, Calif.

[22] Filed: Feb. 1, 1972

[21] Appl. No.: 222,633

[52] U.S. Cl. .......................... 250/71.5 R, 250/83.1
[51] Int. Cl. ............................................. G01j 39/18
[58] Field of Search ..................... 250/71.5 R, 83.1

[56] References Cited
UNITED STATES PATENTS

| | | | |
|---|---|---|---|
| 3,008,045 | 11/1961 | Ruderman et al. | 250/71.5 R |
| 2,795,703 | 6/1957 | Berlman | 250/71.5 R |
| 3,088,030 | 4/1963 | Rickard | 250/83.1 |
| 2,976,418 | 3/1961 | Johnson | 250/83.1 |
| 2,481,964 | 9/1949 | Wollon | 250/83.1 |

*Primary Examiner*—Harold A. Dixon
*Attorney*—L. Lee Humphries et al.

[57] ABSTRACT

A uni-directional spectrometer is described that can detect and distinguish between gamma ray and neutron fluxes. The scintillator has two parallel disposed cylindrical scintillating elements that are made, for example, of plastic. The plastic compound of one element comprises only protons or hydrogen atoms, having atomic weight one, and the other element is made of a chemically similar plastic compound comprising only deuterium or hydrogen atoms of atomic weight two. The two cylindrical scintillator elements are enclosed within an anti-coincidence or outer scintillator element, with both ends of each cylinder exposed. On the same adjacent ends of each cylindrical element are disposed photomultiplier tubes. On opposite sides of the outer scintillator element are disposed two additional photomultiplier tubes. The cylindrical elements and the outer element are each, respectively, enclosed in a thin coating of aluminum except where the respective elements are in contact with the photomultiplier tubes to isolate the light output from each element.

5 Claims, 3 Drawing Figures

GAMMA AND NEUTRON SCINTILLATOR

FIELD OF INVENTION BACKGROUND OF THE INVENTION

The present invention relates to neutron detecting apparatus and, more particularly, to a scintillator that can discriminate between gamma ray, neutron fluxes and charged particles passing through a plane from one direction.

Background of the Invention

The prior art teaches that to differentiate between gamma radiations and neutron flux, two scintillators are required; one to monitor gamma radiation and the other to monitor neutron flux, for example, as taught in U.S. Pat. No. 3,254,217. However, the prior art systems were expensive and relatively heavy. In addition, the prior systems did not teach how to detech radiation traveling from a given direction.

OBJECTS OF THE INVENTION

An object of this invention is to provide a single lightweight neutron detector that also detects gamma radiation.

Another object is to provide a neutron and gamma detector that can detect radiation traveling substantially in the same direction.

Another object is to provide a plastic scintillator to detect gamma and neutron radiation separately.

These and other objects and features of advantage will become more apparent after studying the following description of the preferred embodiments together with the drawings.

DETAILED DESCRIPTION OF THE DRAWINGS

Figure 1:
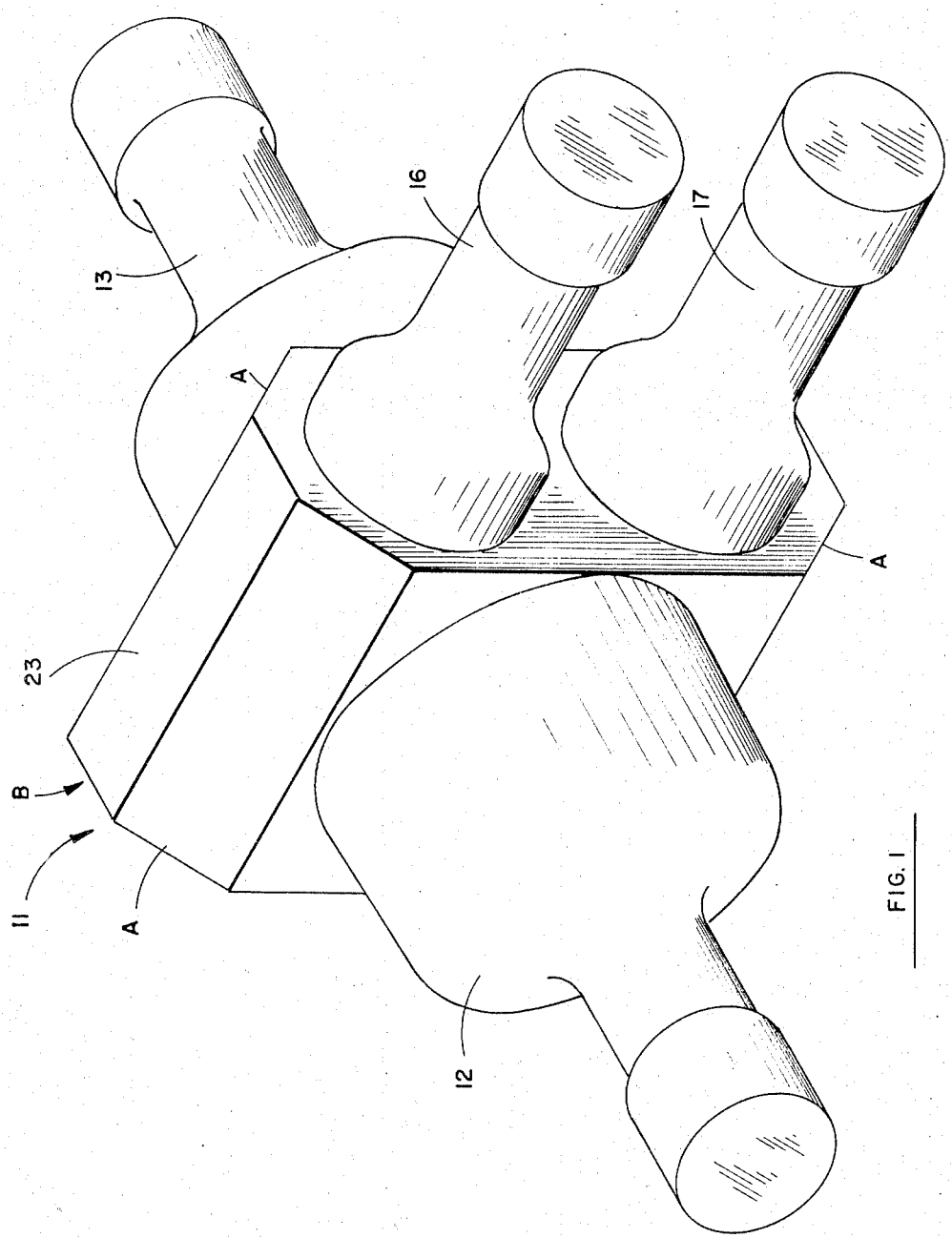
FIG. 1 is a schematic pictorial of the preferred embodiment.

Referring to the drawings and to FIG. 1, in particular, a pictorial view of the novel scintillator 11 is schematically shown which is made of, for example, three plastic elements as will be discussed hereinafter. The scintillator 11 is, for example, 11 inches high by 5 inches wide and 4 inches thick. On opposite sides of the scintillator 11 are disposed two photomultiplier tubes 12 and 13 and on one of the oblong sides are disposed, side by side, two more photomultiplier tubes 16 and 17. Tubes 12 and 13 are preferably 5 inch tubes while tubes 16 and 17 are preferably 3 inch tubes.

Figure 2:
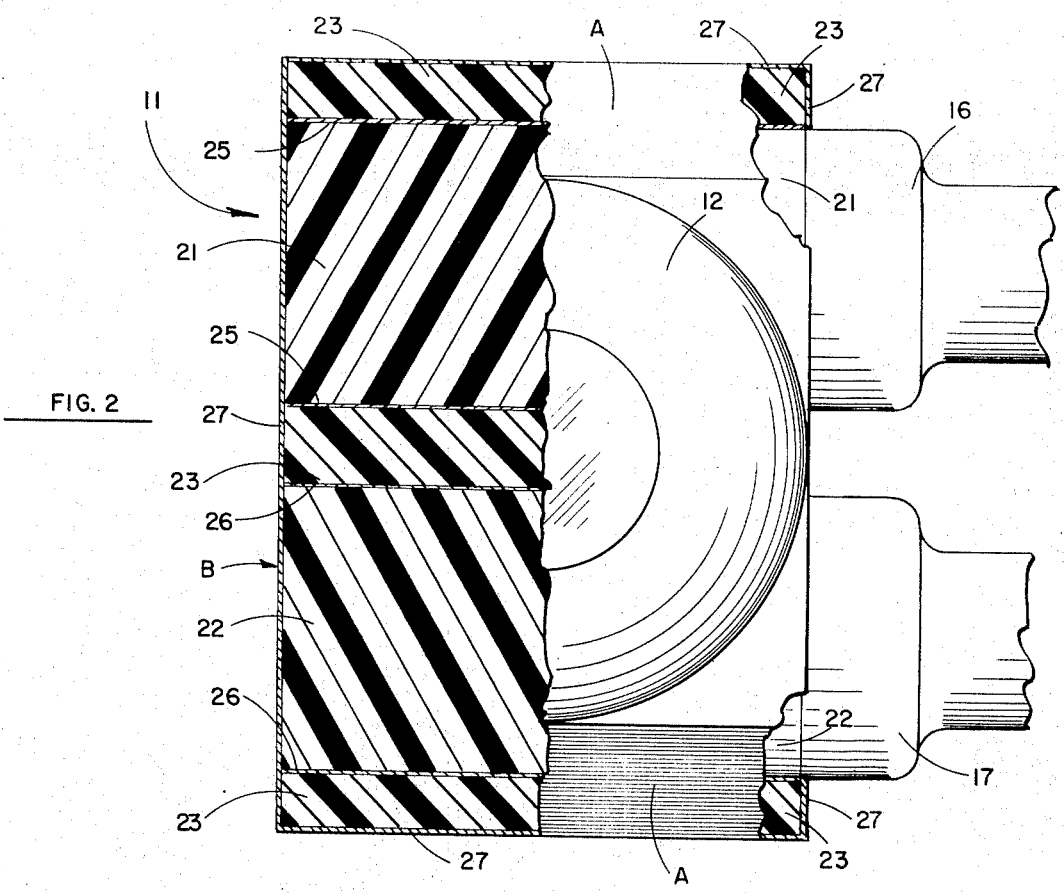
FIG. 2 is a schematic elevation in partial section of the preferred embodiment.
Figure 3:
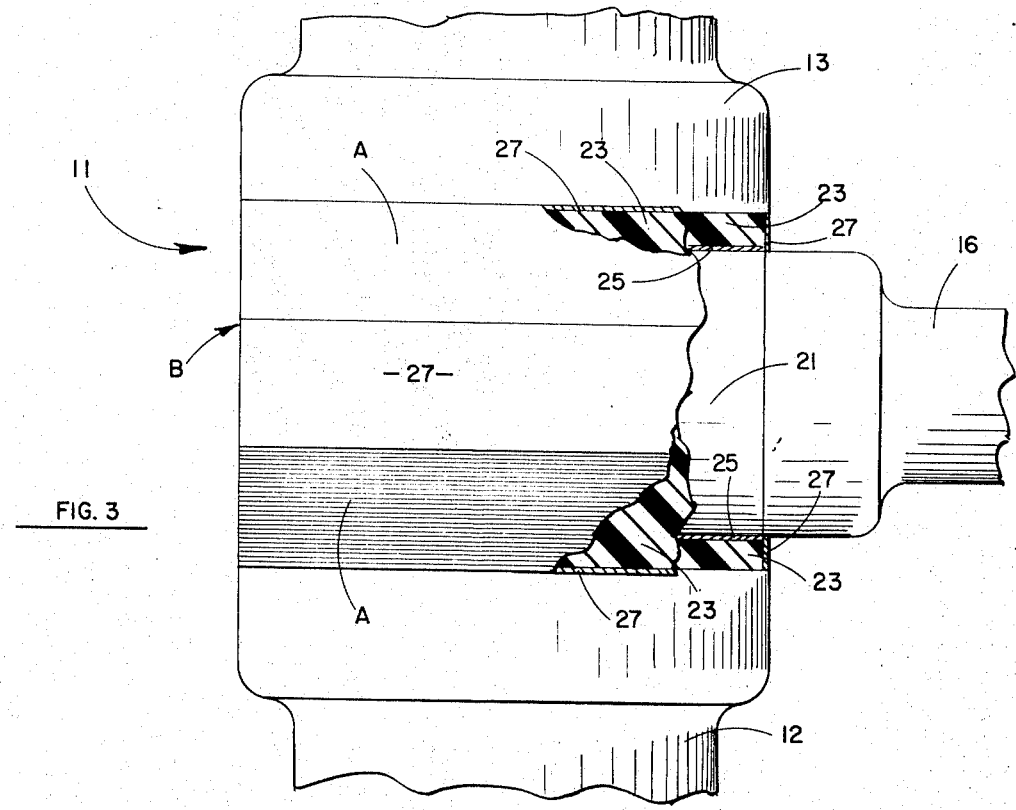
FIG. 3 is a schematic plan view in partial section of the preferred embodiment.

Referring to FIGS. 2 and 3, the details of the scintillator 11 are shown and include two cylindrical scintillating elements 21 and 22 which are surrounded by an outer scintillating element 23. The element 23 encloses both cylindrical elements 21 and 22 along their length leaving both axial ends thereof exposed. As shown in the figures, photomultiplier tube 16 has its face in contact with scintillating element 21 and photomultiplier tube 17 has its face in contact with scintillating element 22. In a similar manner, which is not shown, between scintillating elements 21 and 23 and between scintillating elements 22 and 23 are disposed specular, reflective coatings 25 and 26, respectively. The coatings are made of, for example, aluminum. On the two largest surfaces of the outer scintillating element 23, which surfaces are oppositely disposed, the tubes 12 and 13 are in contact therewith, as shown in FIG. 3. The exposed surface of scintillating element 23 and exposed end surfaces or windows of scintillator elements 21 and 22 are covered also with a specular, reflective coating 27 similar to coatings 25 and 26. The aluminum in coatings 25, 26 and 27 could be foils of metal, vapor deposited films, chemically deposited films, etc. so that any light generated in each scintillating element is only detected by the respective photomultiplier tube in contact therewith.

The novel scintillator operates as follows. One novel feature of this invention is that elements 21 and 22 are made of a hydrocarbon compound that scintillates when interacting with high energy particles as is well known in the art. However, the hydrogen nuclei in the compound in element 21 are mostly protons atoms which have an atomic weight one. As used in this application, hydrogen will denote all isotopes of hydrogen having the chemical valence one. The hydrogen isotope in the compound in element 22 is mostly deuterium which has an atomic weight two. Now, both elements 21 and 22 will respond identically to gamma rays and, essentially, to all such charged particles but will respond differently to neutrons. Therefore, by subtracting the energy spectra after pulse height analysis channel by channel, a measure of the incident fast neutrons spectrum could be obtained. The function of the outer scintillator element 23 is to ensure that only neutrons and gamma rays entering the exposed ends of scintillating elements 21 and 22 will be counted, i.e., that pass one way across a plane. The outer scintillating element 23 is made of, for example, the same chemical compound as scintillator 21, preferably for economy. Since scintillating element 23 is relatively thin, any particle entering it could also enter either element 21 or 22 or both, thereby producing coincident pulses on tubes 16 or 17 and tubes 12 and 13. These coincident pulses denote particles traveling in a direction that do not cross the plane B of the ends of cylindrical elements 21 and 22. To ensure that most of the particles not crossing the defined plane, but entering the outer elements 23, also enter the elements 21 or 22, the four edges of outer element 23 are chamfered at 45° as shown at A in FIG. 1. All pulses in scintillator 23 as well as all pulses in scintillator 21 or 22 which are in coincidence with pulses in scinitllator 23 are electronically rejected. This eliminates charged particles as well as neutron and gamma rays not traveling in the desired direction, i.e. not crossing the entrance plane B.

Although the preferred embodiment has been described, the invention is not limited thereto but includes all embodiments and modifications as covered by the appended claims.

What is claimed is:

1. A scintillator for measuring substantially unidirectional radiation energy comprising:
   first and second scintillator elements of substantially the same configuration;
   said first scintillator element being comprised of a chemical compound having hydrogen atoms with an atomic weight of one and said second scintillator element being comprised of the same chemical compound with hydrogen atoms having an atomic weight of two;

a first photomultiplier tube in contact with a surface of said first scintillator element;

a second photomultiplier tube in contact with a surface of said second scintillator element;

a third scintillator element enclosing both said first and second scintillator elements and leaving an exposed window surface on each of said first and second scintillator elements facing in the same direction;

said third scintillator element being made of the same material as either of said first or second scintillator elements;

at least one photomultiplier tube in contact with said third scintillator element and connected with said first and second scintillator photomultiplier tubes in a manner to form an anti-coincidence circuit whereby only radiation energy entering the exposed window surfaces of said first and second scintillator elements is measured by said scintillator.

2. The scintillator of claim 1 wherein said first, second and third scintillator elements are each covered with a specular reflective coating with openings therein at each such scintillator element to permit light rays to pass to the respective photomultiplier tubes associated with each of said scintillator elements.

3. The scintillator of claim 2 wherein said first and second scintillator elements have an elongated shape and are disposed in spaced, parallel relationship to each other, and said third scintillator element is also disposed between said first and second scintillator elements.

4. The scintillator of claim 3 wherein the axial ends of said elongated first and second scintillator elements are flush with outer surfaces of said third scintillator element to form an exposed window surface on one end of each of said first and second scintillator elements, and said first and second photomultiplier tubes are in contact with the respective other flush axial ends of said first and second scintillator elements.

5. The scintillator of claim 4 wherein two photomultiplier tubes are in contact with said third scintillator element on opposite sides thereof.

* * * * *